United States Patent Office 2,865,773
Patented Dec. 23, 1958

2,865,773

COATING COMPOSITIONS

George S. McKnight, Jr. and Robert C. Brown, Rumford, Maine, assignors to Oxford Paper Company, New York, N. Y., a corporation of Maine No Drawing. Application June 25, 1954
Serial No. 439,474

9 Claims. (Cl. 106—154)

This invention relates to coating compositions and to articles of manufacture coated therewith. More particularly, the invention relates to an improved water resistant coating composition employing monomethylol dimethyl hydantoin and modified soya protein useful in the manufacture of machine-coated paper suitable for offset printing.

In the production of machine-coated paper the coating compositions used should have a solids content of at least 55 percent by weight. The solids content of the coating compositions may, however, vary between approximately 55 and 65 percent by weight. It has heretofore been proposed to use formaldehyde as a tanning agent in paper coating compositions containing soya protein for offset printing. Such coatings are relatively water resistant. However, it has been found that the use of formaldehyde as a tanning agent or water resistant agent in compositions containing about 45 percent by weight solids and above, the compositions rapidly increase in viscosity and can not be smoothed or spread, or utilized in the manufacture of machine-coated paper.

The primary object of the present invention is to provide a coating composition having a high solids content which may advantageously be used in the manufacture of machine coated paper, and also maintain an extremely high resistance to water. Another object of the present invention is to provide a coating composition having increased storage life, and coated paper having early development of wet-rub resistance, increased printing ink oil receptivity, and which has all the necessary and advantageous properties suitable for offset printing.

We have discovered that by adding monomethylol dimethyl hydantoin as a "converting" or tanning agent to soy bean protein paper coating compositions, together with a suitable cutting agent for the soya protein, we can make a coating composition which may be advantageously employed in the manufacture of machine-coated paper, having extremely high resistance to water, and improved properties for offset printing.

An advantage of the coating compositions of the invention resides in the fact that there is an early development of wet-rub resistance. Heretofore in the manufacture of water resistant coated paper it was necessary to permit the coated paper to age for considerable periods of time, 7 to 10 days, before it was even possible to determine by the wet-rub test whether or not the resulting coated paper possessed the necessary water resistant properties or the particular water resistant properties desired. The compositions of the present invention, after being applied to the paper, dried and calendered, may be immediately tested for wet-rub resistance, and it is not necessary to age the coated paper of the present invention in order to determine the wet-rub resistance.

The coating compositions of the present invention also possess increased storage life. Color formulations produced in accordance with the present invention have been stored for periods in excess of 16 hours without any noticeable adverse effects in the coating composition or in the coated paper produced therewith.

The coated papers of the present invention also exhibit improved printing ink oil receptivity over prior high solids offset printing formulations. The coated papers also possess a suitable surface pH for offset printing and utilize less ink in printing than prior machine coated offset printing papers.

The proportions of monomethylol dimethyl hydantoin which may be used in accordance with the present invention may be varied over a rather wide range. The exact amount of monomethylol dimethyl hydantoin is not critical. The minimum amount should be sufficiently in excess of 0 percent to impart to the coated paper the desired degree of water resistance. We have found that about 1 percent by weight of monomethylol dimethyl hydantoin based on the weight of soya protein present produces a coated paper having satisfactory properties in accordance with the present invention. We have also found that 2 percent by weight of monomethylol dimethyl hydantoin based on the soya protein gives advantageous results. We have also utilized the monomethylol dimethyl hydantoin in proportions of 20 percent by weight, and in excess thereof, based on the weight of soya protein present, and have achieved similar results as when 2 percent was used. Proportions in excess of 2 percent do not appear to improve the water resistance or other properties of the coating; however, neither does it impair the advantageous properties of the coating compositions and coated paper of the present invention.

We have also found that in order to utilize the monomethylol dimethyl hydantoin with the soya protein paper coating compositions of the present invention, that it is necessary to employ a cutting agent for the soya protein. Some suitable cutting agents we have utilized are ammonia hydroxide, ammonia metaborate, and mixtures of ammonia hydroxide and sodium hydroxide.

We have also found that the combined use of ammonia hydroxide and sodium hydroxide in the coating compositions of the present invention is advantageous. When utilizing the above combination, it is necessary to maintain a proper proportion of the sodium hydroxide to the ammonia hydroxide. We have found, for example, that when using 15 percent by weight of ammonia hydroxide, 26° Bé., based on the weight of soya protein, that the sodium hydroxide should not be used much in excess of 3 percent by weight based on the soya protein, and that it is advantageous to employ 1–2 percent by weight of sodium hydroxide with 15 percent by weight of ammonia hydroxide.

The following is a specific example, in pounds, illustrating a coating composition prepared in accordance with the present invention:

*Example*

| | |
|---|---|
| Kaolinite clay (Georgia Kaolin Company, "KCS") | 5950 |
| Kaolinite clay (Edgar Brothers, "Stellar") | 1050 |
| Sodium hexametaphosphate ("Calgon" dispersing agent) | 17.5 |
| NaOH | 13.3 |
| Water | 800 |
| Soya protein product containing 88.7% soya protein and 8.5% moisture ("Alpha" Protein, AP5281 Glidden Company) | 900 |
| Tributyl phosphate, defoamer | 5 |
| Acrylic latice (Rohm & Haas "AC-33," plasticizer and adhesive) | 140 |
| Calcium stearate emulsion plasticizer (Arnold Hoffman Co., "415–S") | 15 |
| $NH_4OH$ 26° Bé cutting agent | 135 |
| Monomethylol dimethyl hydantoin | 18 |
| Blue dye _____oz__ | 0.5 |
| Pink dye _____oz__ | 7.5 |

The above components were mixed to form a coating composition of the present invention by placing the soya protein in a suitable closed vessel with a sufficient amount of water to form a slurry containing about 25-30 percent soya protein solids. The slurry was produced at a temperature of about 30° C. The tributyl phosphate defoamer was then added and the temperature raised to about 50° C. The ammonia hydroxide cutting agent was then added and the temperature raised to about 70° C. and held at about 70° C. for 15-20 minutes.

A separate mixture was then made in a kneader by first adding water to the kneader followed by the sodium hydroxide, the Calgon, the dyes, and the clays. To this mixture in the kneader about ⅓-½ of the soya protein preparation as prepared above was then added. The amount of water used was sufficient to give a mixture containing about 72-76 percent solids at this point. This mixture was then thoroughly mixed for about 30 minutes. The temperature was raised by the mixing to about 50-70° C. The remainder of the soya protein preparation was then added to the kneader followed by the calcium stearate emulsion and the acrylic latice. The monomethylol dimethyl hydantoin was then mixed with the remainder of the water, to aid in the mixing operations, and was then added to the kneader and thoroughly mixed therein with the remainder of the components. The coating composition thus produced was then transferred to a blend tank for further mixing and final adjustment with water to a solids content of 63.1 percent.

The resulting color formulation remained stable and useful for a period in excess of 16 hours.

The resulting color formulation was then applied to a web of paper in a conventional machine for producing machine coated paper, dried, and calendered according to standard practice. The coated paper exhibited an immediate water resistance as evidenced by the wet-rub test.

Offset printing tests showed that the coated paper had improved receptivity for printing oil inks, required less ink, and also exhibited an improved ink drying rate over prior offset printing machine coated paper.

Various modifications may of course be made in the color formulations of the present invention and in the above example by those skilled in the art without departing from the present invention. Color formulations may be produced having the properties and shade desired. For example, various other clays or dyes may be used in place of the clays and dyes set forth in the above example. "Premier" clay marketed by Georgia Kaolin Company may be substituted for the "Stellar" clay, or Edgar Brothers' "HT" clay may be substituted for the "KCS". English china clay may also be used. Generally, pigments hown in the art to be compatible in casein bound coating formulations may be used in accordance with the present invention.

Other dispersing agents, defoaming agents, latices, and plasticizers may also be used if desired. For example, tetrasodium pyrophosphate may be used as a dispersing agent, and a butadiene-styrene plasticizer and adhesive marketed by Dow Chemical Corporation as a latice.

The coating compositions of the present invention may be advantageously utilized in the production of machine-coated paper and the resulting coated paper may be advantageously used for offset printing. The compositions, however, may be applied to paper or any other suitable base by any means desired, for it is not necessary to utilize the compositions of the present invention in the production of machine coated paper.

Another advantage of the coated paper of the present invention is that it may also be used for letter press printing.

We claim:
1. An aqueous coating composition which comprises solubilized soya protein and between about 1 and 20 percent by weight based on the weight of soya protein of monomethylol dimethyl hydantoin.

2. An aqueous liquid coating composition which comprises solubilized soya protein, a pigment, and between about 1 and 20 percent by weight based on the weight of the soya protein of monomethylol dimethyl hydantoin, said coating composition having a solids content in excess of about 55 percent.

3. Paper coated with a composition comprising soya protein and about 2 percent by weight based on the weight of soya protein of monomethylol dimethyl hydantoin.

4. An aqueous alkaline liquid coating composition comprising solubilized soya protein, and between about 1 and 20 percent by weight based on the weight of the soya protein of monomethylol dimethyl hydantoin, and a member of the group consisting of ammonium hydroxide, ammonium metaborate, and mixtures of ammonium hydroxide and sodium hydroxide.

5. An aqueous coating composition which comprises solubilized soya protein, a pigment, and between about 1 and 20 percent by weight based on the weight of the soya protein of monomethylol dimethyl hydantoin.

6. Paper coated with the reaction product of the composition of claim 1.

7. Paper coated with the reaction product of the composition of claim 2.

8. Paper coated with the reaction product of the composition of claim 4.

9. Paper coated with the reaction product of the composition of claim 5.

References Cited in the file of this patent

UNITED STATES PATENTS

| | | |
|---|---|---|
| 2,210,481 | Brother et al. | Aug. 6, 1940 |
| 2,354,662 | Bryce | Aug. 1, 1944 |
| 2,370,266 | Smith et al. | Feb. 27, 1945 |
| 2,426,128 | Trowell | Aug. 19, 1947 |
| 2,629,660 | Harsh | Feb. 24, 1953 |
| 2,633,423 | Bower et al. | Mar. 31, 1953 |